(12) United States Patent
Jayanthi et al.

(10) Patent No.: US 10,142,837 B2
(45) Date of Patent: Nov. 27, 2018

(54) MOBILE DEVICE AND SERVER FOR TASK ASSIGNMENTS BASED ON PROXIMITY AND IRIS IMAGE BASED IDENTIFICATION

(71) Applicants: Madhavi Jayanthi, Laguna Niguel, CA (US); Bindu Rama Rao, Laguna Niguel, CA (US)

(72) Inventors: Madhavi Jayanthi, Laguna Niguel, CA (US); Bindu Rama Rao, Laguna Niguel, CA (US)

( * ) Notice: Subject to any disclaimer, the term of this patent is extended or adjusted under 35 U.S.C. 154(b) by 118 days.

(21) Appl. No.: 15/481,429

(22) Filed: Apr. 6, 2017

(65) Prior Publication Data
US 2017/0215071 A1 Jul. 27, 2017

Related U.S. Application Data

(63) Continuation-in-part of application No. 14/957,524, filed on Dec. 2, 2015, now Pat. No. 9,654,918, which
(Continued)

(51) Int. Cl.
| | |
|---|---|
| H04W 12/06 | (2009.01) |
| H04W 4/02 | (2018.01) |
| G06K 9/00 | (2006.01) |
| H04N 5/445 | (2011.01) |
| G01C 21/34 | (2006.01) |
| H04M 1/725 | (2006.01) |

(Continued)

(52) U.S. Cl.
CPC .......... *H04W 12/06* (2013.01); *G01C 21/343* (2013.01); *G06K 9/0061* (2013.01); *G06K 9/00604* (2013.01); *G06K 9/00617* (2013.01); *H04M 1/72522* (2013.01); *H04M 1/72572* (2013.01); *H04N 5/44504* (2013.01); *H04W 4/02* (2013.01); *H04W 4/023* (2013.01); *H04W 4/029* (2018.02); *H04W 4/50* (2018.02); *G01S 19/13* (2013.01); *G06Q 10/107* (2013.01); *G06Q 10/109* (2013.01); *H04M 1/67* (2013.01); *H04M 2250/10* (2013.01); *H04M 2250/52* (2013.01)

(58) Field of Classification Search
CPC ...... G06Q 10/109; G06Q 30/02; G01C 21/20; G01C 21/26; H04M 1/72522; H04W 4/02; H04W 4/50
USPC ..... 701/206, 213, 408, 409, 411; 455/456.1, 455/456.3
See application file for complete search history.

(56) References Cited

U.S. PATENT DOCUMENTS

| | | | | |
|---|---|---|---|---|
| 6,484,033 B2 * | 11/2002 | Murray | ................ | H04M 3/432 455/456.3 |
| 6,731,238 B2 * | 5/2004 | Johnson | .............. | G06F 17/3087 340/5.54 |

(Continued)

*Primary Examiner* — Thomas G Black
*Assistant Examiner* — Wae L Louie (57) ABSTRACT

Mobile device for communicating arrival information at a waypoint, communicating that information to a server, receiving a set of tasks (statically assigned or dynamically assigned) for the user (for example, from the server or from another user), displaying the set of tasks to the user, receiving a completion response (successful or unsuccessful) from the user, and proceeding to the next waypoint along a route/trip plan. A coordination server facilitates communication of a list of tasks assigned to a user to be performed at a specified location. Using the user's iris image for authenticating the user of a mobile device makes mobile task assignment, and other mobile activities more secure.

27 Claims, 4 Drawing Sheets

Related U.S. Application Data is a continuation of application No. 14/136,655, filed on Dec. 20, 2013, now Pat. No. 9,243,912, which is a continuation of application No. 12/070,268, filed on Feb. 15, 2008, now Pat. No. 8,700,310, which is a continuation-in-part of application No. 12/012,859, filed on Feb. 5, 2008, now Pat. No. 8,588,814.

(51) Int. Cl.
| | | |
|---|---|---|
| *H04W 4/50* | (2018.01) | |
| *H04W 4/029* | (2018.01) | |
| *G01S 19/13* | (2010.01) | |
| *G06Q 10/10* | (2012.01) | |
| *H04M 1/67* | (2006.01) | |

(56) References Cited

U.S. PATENT DOCUMENTS

| | | | | |
|---|---|---|---|---|
| 6,861,980 B1* | 3/2005 | Rowitch | G01S 19/05 | 342/357.31 |
| 6,970,871 B1* | 11/2005 | Rayburn | G06Q 30/02 | |
| 7,084,758 B1* | 8/2006 | Cole | G06Q 10/109 | 340/309.16 |
| 7,246,009 B2* | 7/2007 | Hamblen | G07C 5/085 | 340/988 |
| 7,272,493 B1* | 9/2007 | Hamrick | H04W 76/50 | 701/517 |
| 7,475,057 B1* | 1/2009 | Obradovich | G06F 17/30867 | 701/532 |
| 7,522,995 B2* | 4/2009 | Nortrup | G01C 21/3667 | 340/995.19 |
| 7,577,525 B2* | 8/2009 | Hamrick | G07C 5/008 | 701/482 |
| 7,627,334 B2* | 12/2009 | Cohen | G06Q 30/02 | 455/456.3 |
| 7,649,454 B2* | 1/2010 | Singh | G06Q 10/109 | 340/539.11 |
| 7,672,664 B2* | 3/2010 | Silverbrook | H04M 1/21 | 270/52.02 |
| 7,716,298 B2* | 5/2010 | Boss | G06Q 10/107 | 455/456.3 |
| 7,783,590 B2* | 8/2010 | Fukazawa | G06Q 10/10 | 455/414.3 |
| 7,818,317 B1* | 10/2010 | Emigh | H04W 4/02 | 707/724 |
| 7,941,133 B2* | 5/2011 | Aaron | G06Q 10/109 | 455/418 |
| 8,588,814 B2* | 11/2013 | Jayanthi | G01C 21/3438 | 340/988 |
| 8,700,310 B2* | 4/2014 | Jayanthi | G01C 21/26 | 701/408 |
| 9,243,912 B2* | 1/2016 | Jayanthi | G01C 21/26 | |
| 2004/0131014 A1* | 7/2004 | Thompson, III | H04H 60/06 | 370/230 |
| 2005/0227712 A1* | 10/2005 | Estevez | G06Q 10/109 | 455/456.3 |
| 2007/0270159 A1* | 11/2007 | Lohtia | H04L 12/189 | 455/456.1 |
| 2008/0171555 A1* | 7/2008 | Oh | G01C 21/20 | 455/456.1 |
| 2009/0210148 A1* | 8/2009 | Jayanthi | G01C 21/26 | 701/467 |
| 2017/0215071 A1* | 7/2017 | Jayanthi | H04W 12/06 | |

* cited by examiner

MOBILE DEVICE AND SERVER FOR TASK ASSIGNMENTS BASED ON PROXIMITY AND IRIS IMAGE BASED IDENTIFICATION

CROSS REFERENCES TO RELATED APPLICATIONS

The present patent application is a continuation-in-part (CIP) of, claims priority to, and makes reference to U.S. non-provisional patent Ser. No. 14/957,524, filed Dec. 2, 2015, entitled "MOBILE DEVICE AND SERVER FOR TASK ASSIGNMENTS BASED ON PROXIMITY", which in turn is a Continuation (CON) of, claims priority to, and makes reference to U.S. non-provisional patent Ser. No. 14/136,655, filed Dec. 20, 2013, entitled "MOBILE DEVICE AND SERVER FOR GPS SERVICES BASED TASK ASSIGNMENTS", which in turn is a continuation of, claims priority to, and makes reference to U.S. non-provisional patent Ser. No. 12/070,268, patented as U.S. Pat. No. 8,700,310, issued on Apr. 15, 2014, entitled "MOBILE DEVICE AND SERVER FOR FACILITATING GPS BASED SERVICES", filed Feb. 15, 2008, which in turn is a continuation-in-part of, claims priority to, and makes reference to U.S. non-provisional patent Ser. No. 12/012,859, patented as U.S. Pat. No. 8,588,814, entitled "CLIENT IN MOBILE DEVICE FOR SENDING AND RECEIVING NAVIGATIONAL COORDINATES AND NOTIFICATIONS", filed on Feb. 5, 2008. The complete subject matter of all the above-referenced U.S. patent applications is hereby incorporated herein by reference, in their respective entirety.

BACKGROUND

1. Technical Field

The present invention relates generally to a mobile device and particularly to a solution wherein GPS based services are facilitated.

2. Related Art

Mobile devices are becoming ubiquitous. Children carry them and so do adults. Children use them to ask their parents to come pick them up at a mall or a park. Often parents spend a lot of time trying to locate their child at a mall when they get a call for a ride. Similarly, children wait for a long time outside a mall waiting for their parents to arrive, often in inclement weather. This problem is also faced by mobile users who travel to a new country on business and pleasure and wait for a taxi pickup at an airport, outside an airport or in train stations.

Quite often, a user has a mobile phone with a GPS and may desire to go to a store. The user has to type in an address to activate the GPS based navigational facilities. The address could be long and comprise of more than 50 characters quite often, making the user struggle with the painfully small and cramped keyboard on the mobile device. Quite often the keyboards on a mobile device has 3 letters of the alphabet mapped into a single key that makes data entry very complicated and tiring.

Often a user has a mobile phone and drives around town. Unfortunately, the various places the user visits is not known to the user's family or his colleagues at work. If the user's wife had wanted him to buy some stamps when the user was at the post office, she does not have any way to find out if the user visited or went by a post office while driving around town. And the user has no way to automatically determine if his wife needs him to buy something either.

Quite often a manager is a business assigns tasks to his subordinates to get some work done. However, task assignment, such as assigning homes for a sales person to visit on a given day, is usually a priori. If a new task comes up that must be assigned right away, there is no easy way to determine which of the subordinates is the right person to whom the task should be assigned. Such determination may take several phone calls and timely responses from the recipients of those phone calls.

The vCard standard for exchanging electronic business cards has been around for some time and is used for sending email attachments of business cards. They can contain name, address, phone numbers, logos, URLs and photos. However, they do not really help a user in easily navigating from his house to a business (such as a store). There are some deficiencies in the contents of most vCards. Other variations to vCards exists, such as hCard that provide similar features.

GPS satellites have been used for a while for navigation. GPS satellites do not actually pinpoint your location as is commonly believed. The 24 satellites circling the earth each contain a precise clock that transmits a signal comprising a time to the GPS receiver in a user's mobile device. The mobile device processes the satellite signals to determine geometrically where the user is located.

The identification of users of mobile devices is often a challenge—a user might lose his mobile device and an unauthorized access to the services made accessible on that mobile device often occurs when a finder of the mobile device tries to use that mobile device. Illegal access to banking, insurance, and other services provided via a mobile device if a common phenomenon, often due to lack of adequate user authentication, or due to lack of security features.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an elegant means of interaction between people wherein the location information from a first user's mobile device is communicated to a second user's mobile device, and to a plurality of other mobile devices, as necessary. The recipients of the location information can act upon it. For example, using the communicated location information, the second user's mobile device guides the second user to the current location of the first user. In addition, the user of the first mobile device can be the recipient for location information communicated by several other users (for example, communicated by other mobile devices). Also, the recipients of the location information can send a task list to the first user's mobile device requesting the first user to complete those tasks.

The present invention facilitates communicating, from a mobile device, arrival information at a waypoint, communicating that information to a server, receiving a set of tasks (statically assigned or dynamically assigned) for the user (for example, from the server or from another user), displaying the set of tasks to the user, receiving a completion response (successful or unsuccessful) from the user, and proceeding to the next waypoint along a route/trip plan.

The present invention makes it possible to map a phone number (of a business or residence, for example) into a corresponding GPS coordinates (such as longitude and latitude). It also makes it possible to dynamically retrieve such mapping information from mobile devices, if necessary, with optional user consent.

Figure 1:
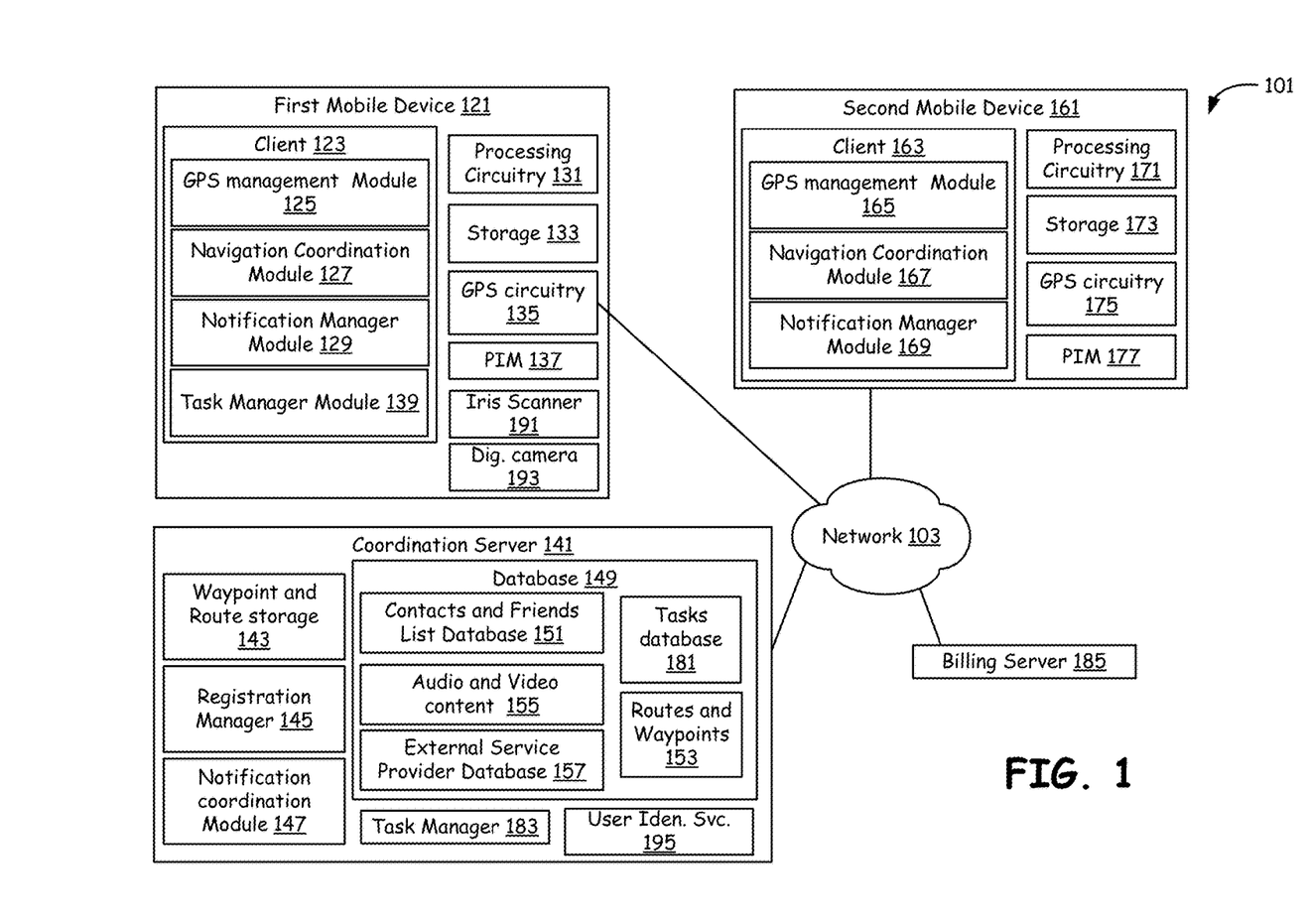
FIG. 1 is a perspective block diagram of a mobile web system wherein a first mobile device with a client software, used by a first user, facilitates sending a location information to a server or to a second mobile device, enabling the server or a client software in the second mobile device to communicate a set of tasks assigned to the first user that are to be completed by the first user after the first user reaches a specific (pre-specified or dynamically specified) location or landmark.

FIG. 1 is a perspective block diagram of a mobile web system 101 wherein a first mobile device 121 with a client software 123, used by a first user, facilitates sending a location information to a coordination server 141 or to a second mobile device 161, enabling the coordination server 141 or a client software 163 in the second mobile device to communicate a set of tasks assigned to the first user that are to be completed by the first user after the first user reaches a specific (pre-specified or dynamically specified) location or landmark. For example, a second user specifies what those tasks are that are to be completed by the first user when the first user reaches (arrives at) a desired location. In addition, based on the location information received from the first mobile device 121, the second user, employing the client software 163, communicates the set of tasks that the first user must complete.

The present invention facilitates communicating, from the first mobile device 121, arrival information at a waypoint, communicating that information to the coordination server 141, receiving a set of tasks (statically assigned or dynamically assigned) for the user (for example, from the coordination server 141 or from the second user), displaying the set of tasks to the first user, receiving a completion response (successful or unsuccessful) from the user, and proceeding to the next waypoint along a route/trip plan.

In general, the client software 123 and client software 163 comprise similar functionality and are capable of sending/receiving location information (GPS based, navigational data based, etc.), specifying tasks for another user when the another user reaches a destination associated with the location information, communicating the tasks to the another user on his mobile device when the another user has reached the destination, and receiving a confirmation from the another user that the task is completed (done), skipped or deferred. The another user employs the mobile device that also comprises the client software 123.

In one embodiment, the user of the first mobile device 121 can create tasks and assign them to the second user, employing an entry in a PIM 137 or contact list available in the first mobile device 121 to identify the second user and select him from a list. The user employs the client software 123 for this purpose, wherein the client software 123 employs a task manager module 139 to create/edit/manage the tasks. The tasks can be saved locally and communicated to the second mobile device 161 when the second mobile device 161 (or the second user) sends a notification when approaching a destination or after approaching the destination. The tasks can be also saved remotely at a task database 181 associated with the coordination server 141, and communicated to the second mobile device 161 when the user of the second mobile device 161 sends a notification when approaching a destination or after approaching the destination. At the coordination server 141, the task in the task database 181 is associated with the destination specified, wherein the destination is also stored in a routes and waypoints database 153.

When the first user using the first mobile device 121 is given a ride to his house, such as by the second user, using his vehicle (and perhaps the second mobile device 161 which may be part of the vehicle or separate from it), the second user can save the location coordinates, such as using GPS coordinates, employing the client software 163 available in his GPS enabled second mobile device 161. In particular, the personal information manager (PIM) 177 available in the second mobile device 161 is used by the client software 163 to store the location coordinates, and associate it with the first user's contact information available (or created) in the PIM 177. In one embodiment, the second user is prompted to select one or more PIM 177 entries (contacts in the PIM) and associate the location coordinates with the PIM 177 entries. The updated contact information stored in the PIM 177 comprises GPS coordinates and other navigational data (including optional routes). Such updated contact information can be retrieved in standard formats, such as VCF, and sent as attachments to emails, instant message, etc. When the first user sends an email, and attaches his contact information, such as a contact information in VCF format, the GPS coordinates typically associated with his address (him home address, for example) is sent in the contact information. In one embodiment, the first user's current location coordinates is retrieved using the client software 123 in the first mobile device 121 (dynamically, as and when needed) and incorporated into the contact information in VCF format that is sent as an attachment in an email, etc.

The PIM 137, 177 entries can be stored at a coordination server 141. In one embodiment, users can upload (or enter using a webpage) their own home addresses and business addresses and corresponding GPS coordinates to the coordination server 141.

The coordination server 141 offers a service that, given an address, retrieves GPS coordinates and displays it or communicates it. It also is capable of computing GPS coordinates for a given address. The coordination server 141 is capable of providing a contact information for a given email address based or a given user wherein the contact information also comprises location information such as GPS coordinates for the user. It facilitates retrieving contact information in a VCF format that also incorporates GPS coordinates. The coordination server 141 also offers a service wherein a user can retrieve (from his first mobile device 121, for example) location information for a given phone number or email address. For example, a user can use the phone number of a business and retrieve GPS coordinates for (at least one office/branch/store) the business, or a list of GPS coordinates for one or more locations where the business has a presence. The coordination server 141 also makes it possible to compute geocoding based location information in terms of, for example, latitude and longitude when given an address or a phone number. The present invention makes it possible to map a phone number (of a business or residence, for example) into GPS coordinates (such as longitude and latitude). It also makes it possible to dynamically retrieve that information from the first mobile device 121 if necessary, and with optional first user consent. In a related embodiment, the coordination server 141 maintains a database mapping phone numbers to addresses (and GPS coordinates or is able to compute them from the address) and it provides GPS coordinates and addresses in response to a request by the first user (from the first mobile device 121, for example) wherein the first user provides a phone number as part of the request.

In one embodiment, the client software 123 in the first mobile device 121 communicates a phone number of a business to the coordination server 141 along with the first user's (own user) address or phone number. The coordination server 141 determines a detailed route for traveling from a starting point associated with the first user's phone number (or address) to the destination associated with the business (as determined using the phone number of the business and other related information) and sends details instructions that can be used by the client software 123 in guiding the first user to the destination. Such detailed instructions comprise textual directions, audio directions, maps, places to see and things to do at those locations, or a combination of these.

In one embodiment, the first mobile device 121 does not comprise a GPS circuitry and navigational software. It acquires a current location information, such as GPS coordinates or an address and communicates it to the second mobile device 161, which comprises a GPS circuitry and navigational software. The second mobile device 161 receives the current location information of the first mobile device (such as, directly from the fist mobile device 121, from the coordination server 141, etc.) and accepts it, stores in optionally, and navigates to that location.

The user of the first mobile device 121 selects a plurality of addresses using the client software 123 (that browses through the PIM 137 contact lists for example, or other stored set of GPS coordinates) and the client software 123 then determines an optimal route (employing the navigation manager module 129, for example) through those addresses selected. For example, it uses the selected addresses as waypoints and determines an optimal route through them, based on time or distance used as a routing criteria. The client software 123 sends notification to other users along the destination(s) to automatically inform those users of the "approach" and arrival at those destinations(s). In addition, any responses to the notifications sent by the other users from those destination(s), are received by the client software 123 and displayed to the user of the first mobile device 121. The optimal route through those addresses selected by the user can be saved (at the first mobile device 121 and also at the coordination server 141) for subsequent sharing and use. The user can also enter planned/recommended activities for locations associated with those addresses. In addition, the client software can retrieve and incorporate those recommended activities from an external server (for example). The user can optionally download/retrieve tasks assigned to the user for those addresses. The user of the first mobile device 121 can also skip one (or more) of the plurality of addresses identified as destinations along a planned route, using the client software 123. The client software 123 facilitates re-computing of a planned route (or rerouting in general) and enables the user to navigate and travel to the other destinations of interest while skipping the specified ones. In one embodiment, both the notifications sent and responses received are in audio form, although they can be supplemented by textual messages too. In a related embodiment, the coordination server 141 facilitates the sending of notifications by the first mobile device 121 and the receiving of optional responses to those notifications by the first mobile device 121.

The first and second mobile devices 121, 161 are one of a GPS enabled mobile phone, a navigational device (such as a Garmin, TomTom, etc.), a navigational unit in a vehicle (such as a car, motorcycle etc.), a PDA, a laptop with a navigational circuitry/navigational software, etc. They comprise the client software 123, 163 and navigational circuitry, in general.

The coordination server 141 also comprises a task manager 183 that facilitates sending, receiving and storing of tasks by users. In particular, the first user can assign tasks to a second user that need to be completed/attended to when the second user is at a destination (such as a waypoint along a route). In one embodiment, when the first mobile device 121 automatically informs the coordination server 141 (or the second mobile device 161) that it has reached a certain destination, the coordination server 141 distributes tasks assigned to the first user (of the first mobile device 121. For example, the first mobile device 121 may be navigated by the first user, after it has received location information of a destination from webpage or from a route obtained from the coordination server 141 or from the second mobile device 161 (which can be specified as GPS coordinates, landmark information, etc.). The first mobile device 121 guides the user of the first mobile device 121 to that destination. Then the client software 123 of the first mobile device 121 automatically sends a notification with a message comprising the text "Arrived" when it reaches a destination employing the received location information, to the coordination server 141. The coordination server 141 then automatically retrieves tasks if any that are assigned to the first user to be completed (or to be assigned to the first user) on reaching that specific destination. It communicates those tasks (for example, as a list of tasks) to the first mobile device 121 where it is displayed to the user, prompting the user to review them, and execute them if possible. The user is prompted to enter a response after completing those tasks (for example) indicating completion, failure to complete, deferring completion, etc.

The first mobile device 121 comprises the client 123, a processing circuitry 131, a storage 133 and a GPS/navigational circuitry 135. It also comprises the optional PIM 137 (such as a contact list client and database). The client software 123 comprises a GPS management module 125, a navigational coordination module 127, the task manager module 139 and a notification manager module 129. The a GPS management module 125 interacts with the GPS/navigational circuitry 135, retrieving GPS coordinates, setting GPS coordinates for a destination to which the user wants to go, interacting with the navigational coordination module 127, etc. The client software 123 facilitates browsing through the PIM 137, selecting one or more users contact information (comprising an address, GPS coordinates or location information in some format, or even a phone number) to be used as destinations/waypoints, and incorporating their associated locations as waypoints in a planned route (or a route computed). If the PIM 137 entries for any user comprises a phone number, the coordination server 141 is employed to retrieve an associated address and/or GPS coordinates that is then employed for navigating/routing. Thus dynamic routing is possible when the coordination server 141 provides a dynamically determined location information (such as GPS coordinates) for a given phone number (such as a mobile phone number).

The coordination module 127 facilitates setting landmark information where a user desires to go, guiding a user to reach a destination, following a route (according to a trip plan) to reach a destination, retrieving and displaying a computed route, distance and estimated arrival time for reaching a destination, etc. The notification manager module 129 facilitates receiving notification from other mobile devices and displaying them, sending notifications to other mobile devices informing them of a proximity information, approaching information, arrival information, billing information, etc. The second mobile device 161 also comprises modules and circuitry similar to those in functionality that are described here for the first mobile device 121.

The coordination server 141 makes it possible for the first mobile device 121 to interact with one or more other mobile devices, such as the second mobile device 163. It facilitates communication of notifications, GPS coordinates, navigational information such as trip plans, routes, landmarks, distances, approaching and arrival information, etc. It also facilitates billing for trip plans shared with others, trip plans purchased, services accesses such as notification to a waiting user of a first mobile device who needs to know if his ride has arrived, etc.

The coordination server 141 comprises a waypoint and route storage 143, a registration manager 145, a notification coordination module 147, the task manager module 183 and a database 149. The waypoint and route storage 143 stores and retrieves uploaded trip plans, routes, waypoints, bookmarks, etc. A user can upload them for sharing, and optionally bill others for downloading or using them. The registration manager 145 facilitates user registration and service access, wherein user registration comprises creating an account, optionally setting up a billing account, establishing a login and password, and enabling security services. The registration manager 145 makes it possible for users to register the details of their mobile devices such as one or more of a phone number, an IP address, a device serial number such as ESN or IMEI, MSISDN, a subscriber information, etc. It also facilitates registration of phone numbers and other details of friends and family with whom a user's mobile device is likely to share navigational information, receive notifications and requests for navigation data sharing, etc. The notification coordination module 147 facilitates sending notifications and receiving notifications. The coordination server 141 also comprises the task manager 183 that facilitates creation of tasks, assignment of tasks to users, communication of tasks to a user on his mobile device/navigational unit when the coordination server 141 receives a message/communication from the mobile device indicating arrival at a waypoint, and the management of the lifecycle of the tasks and transitions of the states.

The database 149 comprises a contacts and friends list database 151 that makes it possible to specify (and control) who gets to participate in interactions with a registered user, by default. It facilitates mapping (and retrieving) phone numbers to addresses and/or GPS coordinates, for example. It also comprises a routes and waypoints database 153 that is used to store, retrieve and manage waypoints, trip plans and routes uploaded for sharing by users, those that are made available for sale by businesses, etc. The database 149 also comprises an audio and video content database 155 that is used to store, retrieve and manage audio, video, graphic and textual content that a user would enter as user specified data (recorded by the user for example) for a trip plan or waypoint saved and/or shared by the user.

The database 149 also comprises a tasks database 181 that is used to store and retrieve tasks for a plurality of users, wherein the tasks are associated with one or more waypoints. The waypoints are associated with routes assigned to a user or with a trip plan created for/by the user. The user is expected to execute the tasks at the specified waypoints, and report a success or failure information back to the coordination server 141. For example, the user can indicate that a task has been completed, has been deferred or has been skipped. Similarly, the user can indicate if a waypoint along a route has been skipped, in which case any tasks associated with those waypoints are reassigned to other users or deferred until the user reaches those waypoints in a future trip.

The coordination server 141 facilitates communication of a list of tasks assigned to a user to be performed at a specified location. The list of tasks is delivered to the user of the first mobile device 121 by the coordination server (if such tasks exist) when the coordination server 141 receives notification from the first mobile device 121 indicating arrival at a specific location (that may be predetermined as part of a route, or a destination dynamically selected by the user). The client software 123 in the first mobile device 121 displays the list of tasks, and collects confirmation from the user that they were completed (or not). In addition, user inputs for those tasks, in the form of a from data entry, audio inputs, textual data entry, etc. are collected, and stored, and eventually communicated (and sometimes immediately communicated, based on configuration or needs, for example) to the coordination server 141. The list of tasks may be dynamically determined based on one or more criteria, or they may be a predetermined list of tasks identified by the user. In a related embodiment, the tasks are described in audio form that a user of the first mobile device 121 can listen to, and provide feedback to (such as after successful or unsuccessful completion of the task), the feedback being provided in an audio form (voice inputs for example) or in textual form (or as part of a response screen presented to use wherein user checks radio buttons, etc.), etc. In addition, a task assignment module provided by the coordination server 141 facilitates identifying tasks (that are available and presumably not completed) and assigning them to the user, as relevant. These tasks can be identified from a general pool of tasks or from a user-specific pool of tasks (that may have been created by the user himself, for example). Task completions are noted and the pool of tasks are updated, as necessary.

The client software 123 of the first mobile device 121 also comprises a task manager module 137 that facilitates displaying a list of tasks assigned to the user for individual waypoints along a route, prompting the user to provide a task completion response (for example, done, defer, skip), communicating the task completion response to the coordination server 141, etc. It keeps track of skipped and deferred tasks to enable a user to complete them later, if necessary. The coordination server 141 also keeps track of the response received to the tasks so as to be able to reassign some of the plurality of tasks, if necessary, to the same user or to a different user.

In one embodiment, the first mobile device 121 comprises the processing circuitry 131, memory and storage 133, the global positioning system (GPS) receiver circuitry 135, an iris scanner 191 and a digital camera 193. It also comprises the client software 123. The client software, that is executed by the processing circuitry 131, conducts iris based identity check of a current user based on data collected by the iris scanner 191, and in response, selectively authorizing access to a tasks list. The task list comprises a plurality of tasks to be completed by the user of the first mobile device 121, the plurality of tasks having been selected based on a current location of the first mobile device 121, a street name associated with the current location, or based on a current route being navigated. The client software 123 prompts the user to mark the status of each of the tasks in the task list as "completed", "skipped" or "deferred" (the use of other or additional task status are also contemplated), wherein the client software 123 records and reports the corresponding task status in a task completion response. The iris scanner 191 comprises a digital camera of its own, in one configuration, or uses the digital camera 193 provided. The iris scanner 191, when activated, takes images and makes multiples measurements and collects reference data points, based on which the authentication of the user of the first mobile device 121 is conducted.

The iris scanner 191 comprises a digital camera 193 in one embodiment that, when activated, employs visible and Infra Red (IR) light such that the incident IR light illuminates the eye of the user of the first mobile device 121 and renders the pupil of the user very black, thereby isolating the iris and enabling the iris scanner 191 to locate the center and edge of the pupil of the user, and the edge of the iris, and also enabling the first mobile device 121 to make multiple measurements and reference data point collections, based on which the authentication of the user of the first mobile device is conducted.

In a related embodiment, the images taken by the iris scanner 191 comprises an enhanced iris image that is a combination of a first image from a black-and-white camera of the first mobile device 121 and a second image from a vibrant color camera of the same mobile device, i.e. the first mobile device 121 comprises two cameras, one that is a black-and-white camera and another that is a color camera.

The client software 123 accepts the tasks list comprising a plurality of tasks to be completed by the user of the first mobile device, in response to a notification sent by the client software announcing proximity to, or arrival at a destination. The client software 123 is configured to subsequently report those of the tasks list that are incomplete. The client software 123 is also configured to reassign a user selected selection of tasks from the tasks list to a second mobile device 161 associated with a second user for completion by the second user.

The client software 123 is provided a route comprising a plurality of waypoints for navigation, wherein the client software communicates a notification whenever the first mobile device 121 determines that it has arrived at one of the waypoints, wherein, in response to the notification it receives a dynamically assembled set of tasks to be completed while at that current waypoint among the plurality of waypoints and at subsequent waypoints.

The client software 123 sends, when prompted, an iris image of the user captured by the iris scanner 191, and in response, receives the tasks list for completion by the corresponding user. The client software 123 also comprises a task manager module 139 that facilitates displaying the tasks list assigned to the user of the mobile device for execution at individual waypoints along a given route, the client software 123 prompting the user to provide a task completion response at each waypoint along the route.

In one embodiment, the first mobile device 121 comprises the iris scanner 191 and a processor configured to execute and operate the client software 123, the client software 123 capable of sending and receiving GPS based location information and retrieving a first task list based on a current location. The client software 123 is configured to send, when prompted, an iris image of a user captured employing the iris scanner 191 and communicating it to the coordinating server 141, and in response, receiving a second tasks lists for completion by the corresponding user. The client software 123 is configured to automatically retrieve a third task list for the user based on an iris image captured by the iris scanner 191. The client software 123 is configured to dynamically receive a plurality of item pickup requests from a plurality of businesses, when they are distributed opportunistically to the first mobile device 121 based on a current route being navigated or a current location, wherein the client software updates the status of the individual item pickup requests if it receives a notification of corresponding item pickup. The client software 123 authenticates the user, if necessary, while the user is conducting item pickup requests, or while the user is conducting the tasks of the first task list, the second task list and the third task list, selectively by means of a password challenge, a PIN code prompt, or a iris image verification using the iris scanner.

The first task list, the second task list and the third task list comprise one or more of the following: monitoring and reporting activities, funds transfer activities, authorized payment activities on behalf of someone else, tasks requiring pickup of items, tasks requiring delivery of items, purchase of items, ride sharing, skills training, delivery of technical help, photo capture, video capture, turning on electronic equipment, turning off electronic equipment, a sales demonstration, security checks and premises cleanup. The various task lists, some of which are opportunistically assigned to the user based on certain criteria such as current location and current route, are executed by the user and the user is prompted on the first mobile device to provide a completion status for each of those tasks. In a related embodiment, the user is paid a fee for task completion, and a billing record is created at a billing server 185.

The client software 123 is capable of identifying and delivering tasks specified by the user for communication to a second user currently using the second mobile device 161 upon determination of the proximity of the second user to a specific destination, or upon receiving notification from the second mobile device indicating arrival at that specific destination. The client software 123 receives a completion status response from the second mobile device 161 as and when the second user indicates completion of an associated one of the tasks delivered.

The client software 123 receives and processes a user audio request for tasks associated with a specific first location, and subsequently retrieves and delivers a list of tasks to be conducted by the user, upon determining that the user has succeeded in reaching the specified first location.

The client software 123 of the first mobile device 121 communicates a task list to a second mobile device 161, and in response, receives from the second mobile device 161 completion status response provided by a second user employing the second mobile device 161, wherein the completion status response comprises, for each task of the task list, one of the following status: completed, skipped or deferred.

The client software 123 in the first mobile device 121 communicates a destination phone number of a business to the coordination server 141 along with the user's current address or phone number, in response to which it receives from the coordination server 141 a detailed route for traveling from a starting point associated with the user's phone number or address to the destination associated with the business, and receives in addition detailed instructions that is used by the client software 123 in guiding the user to the destination.

The client software 123 in the first mobile device 121 conducts a billing transaction for tasks completed and is able to provide a trip bill incorporating all the tasks completed during a specific trip along a user specified path from a origination point to the destination.

In one configuration, the client software 123 in the first mobile device 121 communicates a billing request when the user indicates completion of any task, wherein the billing request is communicated to the billing server 185.

In another configuration, the first mobile device 121, upon receiving instructions from the user, forwards a subset of the tasks received to a second user currently employing a second mobile device 161.

In one embodiment, the client software 123 gathers a witness signature attesting to the completion of one or more of the tasks by a user of the first mobile device 121, wherein the witness signature is provided by a witness. For example, after completion of a specified task in the tasks list at the appropriate location, the user of the first mobile device asks a witness (another person) to provide a signature (using a touch sensitive screen and a pen or stylus on the first mobile device 121). The use of audio signatures (audio message of witness that is hashed/encrypted) and digital photo of the witness are also contemplated.

In one configuration, the client software 123 of the first mobile device 121 provides a map displaying locations where the user successfully completed tasks assigned to the user, along with corresponding task details, and also displays tasks that the user failed to successfully complete, along with their corresponding locations on the map.

In one configuration, the coordination server 141 communicatively coupled to the first mobile device 121 comprises at least one processor for communicating with the first mobile device, the at least one processor operable to, at least receive several tasks for completion, along with a corresponding task sender identification and completion status and receive a current location of the first mobile device 121, a street name associated with the current location, or a current route being navigated, from a client software 123 in the first mobile device 121. The coordination server 141 prompts the user of the first mobile device 121 to provide at least one iris image. It then identifies the user of the first mobile device based on the at least one iris image. Upon successful identification, the coordination server 141 enables access to services, data, tasks list, etc. The coordination server 141 delivers to the client software 123 of the first mobile device 121 a task list comprising a plurality of tasks selected from the several tasks received, to be completed by the user of the first mobile device 121, after successful identification of the current user based on the at least one iris image. It subsequently receives, processes and stores a task completion status for each of the plurality of tasks as they are reported by the client software 123 of the first mobile device 121.

In some situations, based on mobile device types and device capabilities, the at least one iris image of the current user received by the coordination server 141 comprises combined iris images, such as those generated combining an iris image from a black-and-white camera of a mobile device and an iris image from a vibrant color camera of the same mobile device. The coordination server 141 is also capable of combining multiple images it receives in order to enhance iris image based identification of a remote user.

In some configurations, when multiple iris images of the current user is obtained by the coordination server 141 for authentication of the user, the multiple iris images comprise at least one iris image from each of the two eyes of the user. The coordination server can select on or more of the images from one of the eyes of the user for identification, or employ images from both eyes of the same user.

The coordination server 141 collects a plurality of addresses selected by the user and then determines an optimal route through those addresses selected. It sends notification to other known and registered users along the optimal route to automatically inform those corresponding registered users of the impending approach of the user towards their respective current locations followed by a second notification indicating subsequent arrival of the user at those locations. In a related configuration, the coordination server 141, for successful authentication of the user, compares at least one of the at least one iris image received, to iris images stored in a database 149. After successful authentication of the user based on the comparison, the coordination server 141 provides instructions and data to aid completion of the tasks assigned to the user.

In one configuration, the least one processor of the coordination server 141 selectively conducts dual iris authentication for the user if necessary, wherein the server receives multiple iris images comprising a left iris image and the right iris image of the user. The at least one processor compares the left iris image and the right iris image of the user to iris images stored in the database 149, for user authentication and for selective retrieval of tasks for completion by the user.

The coordination server 141 sends a recapture message to the first mobile device 121, when iris image based authentication fails based on the at least one iris image provided, wherein the server selectively recommends an alternate iris image segmentation with better circle localization and non-iris region detection, and a better image compression technique for the at least one iris image.

The coordination server 141 receives, from the first mobile device 121 used by a first user, a notification indicating arrival at a destination, or arrival in proximity to the destination, and, in response, the coordination server 141 communicates to the first mobile device 121 a set of tasks to be completed by the first user at specific locations, wherein the set of tasks are those specified by a second user employing the second mobile device 161, wherein the set of tasks are stored at the coordination server 141 until delivery to the first mobile device 121.

The coordination server 141 receives a completion status response from the first mobile device 121, wherein the completion status response is associated with the task list comprising a plurality of tasks communicated by the coordination server 141 to the first mobile device 121. The completion status response for each of the plurality of tasks comprises one of the following status: completed, skipped or deferred.

The first mobile device 121 is provided a route by the coordination server 141 comprising a plurality of waypoints for navigation, wherein the coordination server 141 receives a notification from the first mobile device 121 whenever the first mobile device 121 determines that it has arrived at one of the plurality of waypoints, wherein, in response to the notification received, the coordination server 141 communicates to the first mobile device 121 a dynamically assembled set of tasks to be completed while at that current waypoint, among the plurality of waypoints.

Figure 2:
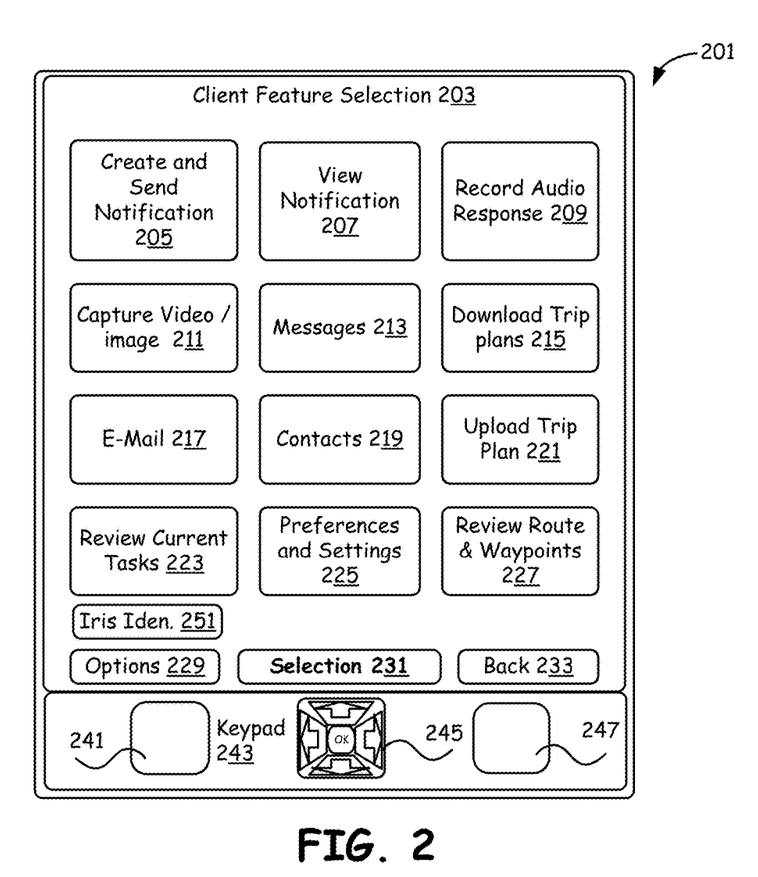
FIG. 2 is an exemplary snapshot of a client feature selection screen of the mobile phone that is presented by the client software that is installed and run in the mobile device in accordance with the present invention.

FIG. 2 is an exemplary snapshot of a client feature selection 203 screen of the mobile phone 201 that is presented by the client software 123 that is installed and run in the mobile device 201 in accordance with the present invention. The client feature selection 203 comprises the buttons/icons list from 205-227 whose selection will accomplish the corresponding functionality. The various features of the client software can be invoked by a user employing the buttons/icons presented on this screen. This screen has buttons/icons such as 'Create and Send notification' 205, a 'view notification' 207, a record audio response 209, a capture video/image 211, a messages icon 213, a Download Trips icon 215, an E-mail icon 217, a Contact (PIM) icon 219, an upload trip plan icon 221, a review current tasks icon 223, a Preferences and Settings icon 225, and a review route & waypoints icon 227. In one configuration, the user is challenged to provide iris identification before the user can review tasks. The user is required to provide iris images using the iris scanner 191 so that iris identification can be performed and the user's authorization to assess tasks or conduct other operations is ascertained/checked.

When the user selects the create and send notification button/icon 205 the client software in the mobile device 201 makes it possible for the user to create a new notification from a list of canned notification messages or make a new one. In particular, the client software makes it possible to send the notification to another mobile device. For example, a canned notification comprising the message "About to arrive at destination" is sent to a user of another mobile device to announce the impending arrival at a destination, the location to which had been previously received from the another mobile device.

The view notification icon 207, when activated, invokes screens that facilitate viewing notifications received and notifications sent. In one embodiment, as soon as a notification is received, it is presented to the user in a view notification screen. In addition, a ring, or a jungle is optionally play to bring it to the user's attention. The user can also respond back to the notification, such a response can be provided using audio recording facilities, selecting an appropriate graphic response from a list of pre-created graphics, or by typing text. The record audio response 209 button activates audio functions, such as those that are used to record an audio response, or those used to play audio responses received. In general, a user can choose to provide an audio input to a received notification immediately, or in a deferred/delayed manner, using the record audio response 209 facility.

The capture video/image icon 211 starts video recording, digital photo capture or imaging functionalities. It can also be used to review received video content and play them. The messages icon 213 is used to send messages, for example an SMS message to other mobile phones and client computers. In one embodiment, it is used to send a canned message (pre-recorded) to one or more recipients using the coordination server, wherein the canned message (which may be pre recorded by the user or provided by the service) is either stored and sent from the mobile phone 121 or retrieved from the coordination server 141. In this embodiment, the client 123 is transparently used for sending a message.

The Download trip plans icon 215 supports download of interactive content such as trip plans, from the coordination server, wherein the downloaded content is handled/processed by the client 203 for a service. For example, the trip plans may be tagged with an appropriate MIME type and the client 203 is invoked for content with those MIME types that the client 203 is registered to (and is capable of) handle. In one embodiment, Downloads trip plans 215 provides a shortcut through which a mobile web browser is started and prompts the user to enter a URL of the download site for downloading the trip plan contents.

The e-mail icon 217 starts an e-mail client on the mobile phone prompting the user to login into his e-mail account for sending and receiving e-mails comprising notifications, trip plans, etc. The Contacts icon 219 is the user interface to the 'PIM' (personal information management) available in the mobile device 121, 201, which facilitates managing the contact list available in the mobile device 121. The contacts managed in the PIM comprises individual entries for friends/colleagues, etc. and also names of groups of friends, wherein the membership (individual contact information for the members of the group) details are remotely available at the coordination server 141 (or even at an external service provider website, etc.).

The upload trip plan 221 icon facilitates uploading waypoints, trip plans and associated multi-media content, etc. to the coordination server 141. For example, a user is prompted to upload a trip plan that comprises a plurality of routes, each route comprising one or more waypoints and one more associated audio information, video information, pictures, textual descriptions, etc. In addition, each waypoint may one more associated audio information, video information, pictures, textual descriptions. The trip plan is stored as an XML file and uploaded as an XML in one related embodiment. Other forms of structuring, organizing and storing the related data are also contemplated. The trip plan is uploaded to one or more servers, such as the coordination server 141.

The review current tasks icon 223 opens a list of tasks currently assigned to the user that the user can review and provide a status information or response to. The user can review tasks assigned to him as well as task lists created by the user himself The user can retrieve tasks assigned from the coordination server or those saved locally.

The Preferences and Settings icon 225 facilitates an interface for the configuration of the mobile device 201, 121 in terms of its appearance and performance. The review route & waypoints icon 227 provides a screen where lists of routes are presented, along with lists of waypoints/landmarks/etc. for each route, etc. The user can view tasks assigned (statically) for each waypoint along a route. Later on during navigation, additional dynamically assigned tasks also show up in the list while those reassigned to another user are deleted automatically from the list of tasks displayed.

The client feature selection screen 203 also comprises some soft keys/buttons such as an 'Option' soft key 229, a 'Selection' soft key 231, and a 'Back' 233 soft key. The default action is the 'Selection' 231 button on this screen (i.e. the client feature selection screen) of the highlighted icon when the OK button is hit on the 'joystick' 245 from the keypad 243.

The client feature selection screen 203 also comprises an "iris identification button" 251 which when activated triggers capture of a user's iris images employing the iris scanner's own digital camera in one configuration, such that the captured iris images of the user is used for identifying the user and authorizing other actions based upon the identification of the user. If the user is identified to be an authorized user, using iris images, who has the rights to conduct mobile banking transactions and other operations, the client software 123 allows such operations. Thus the results of the iris identification activities determine if the user will be allowed to conduct such/similar transactions. For example, if the user is identified to be an authorized user who has the rights to retrieve tasks lists, or rights to review task lists received, the results of the iris identification activities determine if the user will be allowed to review or conduct those tasks.

Activating the 241 key from the keypad 243 will open the Options 229 functionality, which results in presenting the user with a list in a menu or sub-menu, which can be browsed using the 'joystick' 245. The 'Back' soft key/button 233 will be selected when the key 247 is activated on the keypad 243, to cancel the current screen to go back to the previous one.

Figure 3:
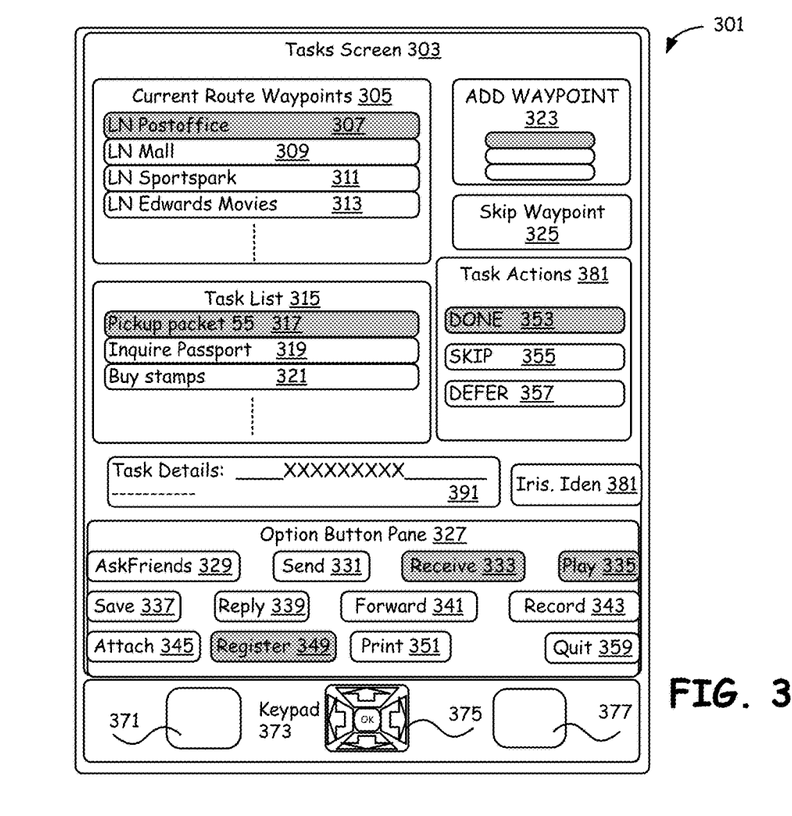
FIG. 3 is an exemplary screen snapshot of a mobile phone depicting the tasks careen used to review tasks and provide status/responses by a user conducting the tasks.

FIG. 3 is an exemplary screen snapshot 301 of a mobile phone 121 depicting the tasks careen 303 used to review tasks and provide status/responses by a user conducting the tasks. Such tasks are displayed in lists assembled dynamically by a coordination server and communicated to the mobile device 301, or previously assigned to the user and stored for subsequent access/display.

The tasks screen 303 comprises a current route waypoints 305 list that displays one or more waypoints 307, 309, 311, 313 associated with a current route, sent by the coordination server and dynamically changed (if necessary) by the coordination server or by the user. It also comprises a task list 315 that displays all the tasks associated with a selected waypoint, such as LN postoffice 307, which the user can select from the list 305. The user can select one of the tasks in the list 315 and provide a status information or response indicating completion, etc. For example, using the task actions 381, the user can indicate if a task is done 353, skipped 355 or deferred 357. When the user (and the mobile device) is in proximity to a waypoint destination the tasks for that waypoint/destination is displayed in the task list 315 and the user can try to complete the tasks and provide a response using the buttons in the task actions 381.

The user can add a waypoint to a route using the Add Waypoint pane 323. The user can also skip a waypoint from a route by selecting that waypoint and activating the skip waypoint button 325.

For a selected task in the task list 315, details of the task are displayed in a task details 391 pane/section. In addition, any recorded message can be played using the Play button 335. New tasks can be received dynamically by the mobile device, such as by triggering a receive button 333.

For example, the details of the tasks to be conducted by the first user of the first mobile device after reaching a previously specified destination may have been provided by second user and communicated to the first user navigating to the specified waypoint/destination. The first user would choose one of the tasks at a time, conduct the task, and provide a feedback employing the task actions 381. The first user would review the task details 391 if necessary and even listen to audio or video details for the tasks by activating the play 335 button.

The 'receive' button 333 is selected by a user to download all the tasks/messages and notifications that have been received by a user (into his registered user's account, for example). In one embodiment, the received data comprise tasks received, responses for tasks completed, etc. The tasks can be sorted by categories or sorted by date/time on the mobile phone 121 of FIG. 1. In one embodiment, the tasks received are identified by a task name/title.

In one configuration, an iris identification button 381 is provided that enables user identification using images of the user's iris employing the iris scanner 191. In addition, the user is challenged to provide iris identification before the user can conduct certain operations, such as reviewing tasks or conducting task completion status reporting operations. The user is required to provide iris images using the iris scanner 191 so that iris identification can be performed and the user's authorization to assess tasks or conduct task related operations is ascertained/checked.

Figure 4:
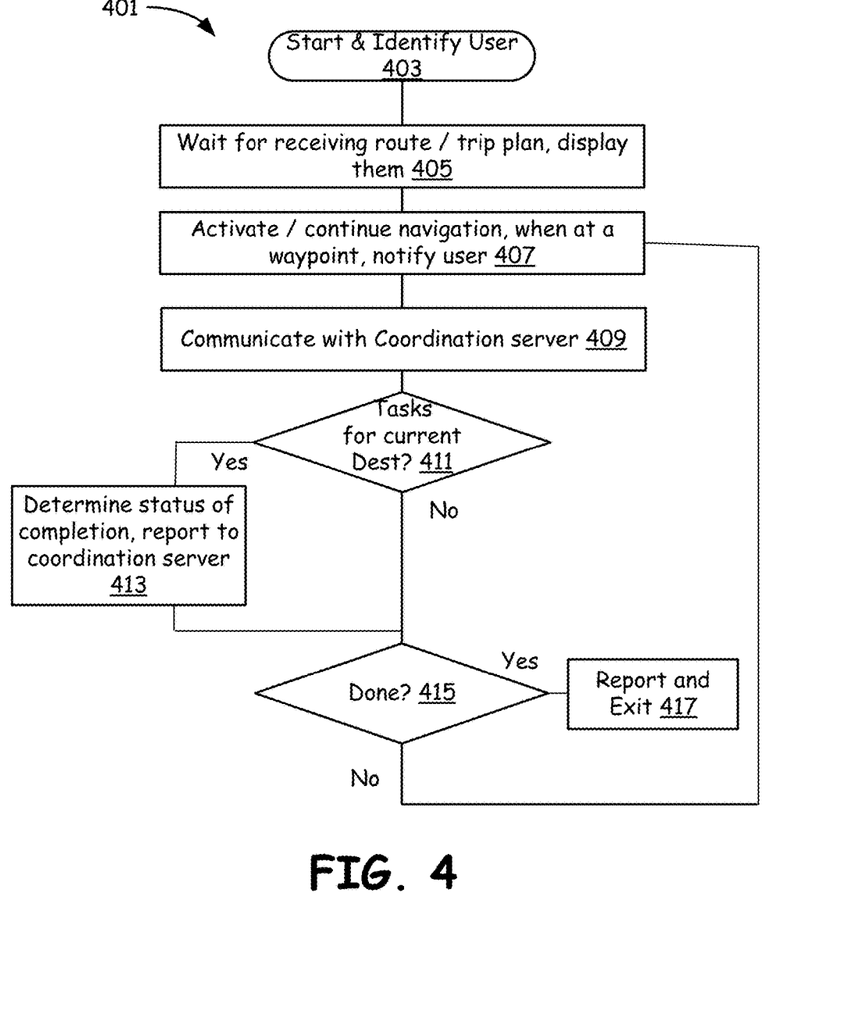
FIG. 4 is a flowchart of an exemplary operation of a first mobile device that is capable of receiving tasks assigned to a user when the user with the first mobile device reaches a destination specified where the tasks are expected to be completed by the user.

FIG. 4 is a flowchart of an exemplary operation of a first mobile device that is capable of receiving tasks assigned to a user when the user with the first mobile device reaches a destination specified where the tasks are expected to be completed by the user. The first mobile device comprises a client software capable of navigating to one or more waypoints/landmarks/addresses in a route provided, wherein the waypoints/landmarks information comprise a navigational data such as GPS coordinates.

At a start & identify user block 403, the processing starts in the first mobile device when the user starts navigating, and the identity of the user is checked using iris images captured by the iris scanner 191 (for example). If the identity of the user cannot be ascertained, the user is not allowed to conduct some type of operations, such as task retrieval or task reporting of a certain kind or category. Later, at a next block 405, the first mobile device waits for receiving route/trip plans, and displays them. The user may be prompted to accept the route/trip plan (and thereby provide consent). For example, the user of the first mobile device accepts a route/trip plan received and starts following the navigation guidance provided by the first mobile device. In general, waypoint/destination information is provided in the form of a landmark information, a GPS coordinates, etc.

Then, at a next block 407, based on the current route/trip plan, and navigational information thereof, such as GPS coordinates or alternative information (such as a landmark specification), navigation to the next waypoint/landmark is activated. At a next block 409, when the mobile device is at the waypoint/landmark, the user is notified and prompted to conduct the tasks, if any. In one embodiment, the tasks for that waypoint are retrieved from the coordination server by the mobile device after reaching the waypoint/landmark. The coordination server dynamically determines what tasks are to be assigned to the user at that waypoint/landmark. In a different embodiment, the mobile device automatically sends a message/notification to the coordination server on arriving at the destination (waypoint/landmark, etc.) and the coordination server automatically retrieves tasks (from a database or from an external system/computer) and communicates it to the mobile device.

Then, at a next decision block 411, an attempt is made to determine if the user of the first mobile device has any tasks assigned for the current waypoint/landmark/destination. If it is determined that the user does have one or more tasks to be conducted, then, at a next block 413, a determination of the status of completion of the tasks is made, and a report is communicated to the coordination server. For example, the user enters one of the available task actions (such as Done, Skip, Defer) for each of the tasks listed for the user for the current location. Control then passes to the next decision block 415 where an attempt is made to determine if the navigation in accordance with the route/trip plan is completed/done.

If, at the block 415, it is determined that there is no more waypoints/destinations to be visited in accordance with the route/trip plan, then, at a next block 417, a report is sent to the coordination server and the operation exits. Otherwise, the operation proceeds to the next block 407 where navigation proceeds to the next waypoint/landmark, and the user is notified after reaching the that location.

If, at the decision block 411, it is determined that user of the first mobile device does not have any tasks assigned for the current waypoint/landmark/destination, then at the next decision box 415, it is determined if there are no more waypoints/destinations to be visited in accordance with the route/trip plan.

In general, the present invention makes it possible to communicate multimedia contents along with task lists to the mobile device from the coordination server. In addition, routes can be dynamically changed and waypoints added/deleted by the coordination server, such as when a user has reached a waypoint and completes associated tasks, and the coordination server determines that it needs to change tasks at subsequent waypoints, or even to drop or add waypoints. This provides support for ad-hoc modifications to trip plans and routes, and adhoc navigation with consent of users. Such transfer of navigational information (routes being communicated, GPS coordinates being exchanged or waypoint information being exchanged) from the coordination server to the first mobile device is useful and timely. In addition, the combination of GPS coordinate communication with audio message notifications and subsequent responses is convenient for the users involved, with the use of keyboards minimized if not altogether eliminated.

The present invention discloses a mobile device comprising a global positioning system (GPS) receiver circuitry capable of pinpointing a location and providing directions to a destination. It employs a client software capable of interacting with the GPS receiver circuitry and activating navigation towards the destination. The client software receives a request to navigate to the destination from a second mobile device or the coordination server and accepts the request. It then navigates and provides directions to lead the user to the destination. It also automatically sends notifications to the second mobile device. The client software receives tasks and displays them for the user. The present invention also discloses a mobile web system comprising a server communicatively coupled to the first mobile device and the second mobile device. The server facilitates sending tasks to the first and second mobile devices after they arrive at a destination of interest. It also facilitates receiving notifications of task completions from a plurality of mobile devices that congregate at a location, and is able to verify their presence, challenge the users for verification/security, etc. The navigational coordinates are based on at least one of a latitude, longitude, and height system, earth centered Cartesian coordinates, earth centered earth fixed, earth centered inertial, and east north up.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A mobile device comprising:
   a processing circuitry, memory and storage;
   a global positioning system (GPS) receiver circuitry;
   an iris scanner;
   a client software, that is executed by the processing circuitry, conducting iris based identity check of a current user based on data collected by the iris scanner, and in response, selectively authorizing access to a tasks list;
   wherein the task list comprises a plurality of tasks to be completed by the user of the mobile device, the plurality of tasks having been selected based on a current location of the mobile device, a street name associated with the current location, or based on a current route being navigated;
   the client software prompting the user to mark the status of each of the tasks in the task list as completed, skipped or deferred, wherein the client software records and reports the corresponding task status in a task completion response; and wherein the iris scanner comprises a digital camera that, when activated, takes images and makes multiples measurements and collects reference data points, based on which the authentication of the user of the mobile device is conducted.

2. The mobile device of claim 1 wherein the iris scanner comprises a digital camera that, when activated, employs visible and Infra Red (IR) light such that the incident IR light illuminates the eye of the user of the mobile device and renders the pupil of the user very black, thereby isolating the iris and enabling the iris scanner to locate the center and edge of the pupil of the user, and the edge of the iris, and also enabling the mobile device to make multiple measurements and reference data point collections, based on which the authentication of the user of the mobile device is conducted.

3. The mobile device of claim 1 wherein the images comprises an enhanced iris image that is a combination of a first image from a black-and-white camera of the mobile device and a second image from a vibrant color camera of the same mobile device.

4. The mobile device of claim 1 wherein the client software accepts the tasks list comprising a plurality of tasks to be completed by the user of the mobile device, in response to a notification sent by the client software announcing proximity to, or arrival at a destination; and wherein the client software is configured to subsequently report those of the tasks list that are incomplete; and the client software is configured to reassign a user selected selection of tasks from the tasks list to a second mobile device associated with a second user for completion by the second user.

5. The mobile device of claim 1 wherein the client software is provided a route comprising a plurality of waypoints for navigation, wherein the client software communicates a notification whenever the mobile device determines that it has arrived at one of the waypoints, wherein, in response to the notification it receives a dynamically assembled set of tasks to be completed while at that current waypoint among the plurality of waypoints and at subsequent waypoints.

6. The mobile device of claim 1 wherein the client software sends, when prompted, an iris image of the user captured by the iris scanner, and in response, receives the tasks list for completion by the corresponding user; and the client software also comprises a task manager module that facilitates displaying the tasks list assigned to the user of the mobile device for execution at individual waypoints along a given route, the client software prompting the user to provide a task completion response at each waypoint along the route.

7. A server communicatively coupled to a first mobile device, the server comprising:

at least one processor for communicating with the first mobile device, the at least one processor operable to, at least:

receive several tasks for completion, along with a corresponding task sender identification and completion status;

receive a current location of the first mobile device, a street name associated with the current location, or a current route being navigated, from a client software in the first mobile device;

prompt the user of the first mobile device to provide at least one iris image;

identify the user of the first mobile device based on the at least one iris image;

deliver to the client software of the first mobile device a task list comprising a plurality of tasks selected from the several tasks received, to be completed by the user of the first mobile device, after successful identification of the current user based on the at least one iris image; and receive, process and store a task completion status for each of the plurality of tasks as they are reported by the client software of the first mobile device.

8. The server of claim 7 wherein the at least one iris image of the current user comprises combined iris images generated combining an iris image from a black-and-white camera of a mobile device and an iris image from a vibrant color camera of the same mobile device.

9. The server of claim 7 wherein multiple iris images of the current user is obtained for authentication of the user, the multiple iris images comprising at least one iris image from each of the two eyes of the user.

10. The server of claim 7 wherein the server collects a plurality of addresses selected by the user and then determines an optimal route through those addresses selected; and wherein the server sends notification to other known and registered users along the optimal route to automatically inform those corresponding registered users of the impending approach of the user towards their respective current locations followed by a second notification indicating subsequent arrival of the user at those locations.

11. The server of claim 7 wherein the at least one processor, for successful authentication of the user, compares at least one of the at least one iris image received, to iris images stored in a database; and after successful authentication of the user based on the comparison, provides instructions and data to aid completion of the tasks assigned to the user.

12. The server of claim 7 wherein the at least one processor selectively conducts dual iris authentication for the user if necessary, wherein the server receives multiple iris images comprising a left iris image and the right iris image of the user, wherein the at least one processor compares the left iris image and the right iris image of the user to iris images stored in the database, for user authentication and for selective retrieval of tasks for completion by the user.

13. The server of claim 7 wherein the server sends a recapture message to the mobile device, when iris image based authentication fails based on the at least one iris image provided, wherein the server selectively recommends an alternate iris image segmentation with better circle localization and non-iris region detection, and a better image compression technique for the at least one iris image.

14. The server of claim 7 wherein the server receives, from a first mobile device used by a first user, a notification indicating arrival at a destination, or arrival in proximity to the destination, and, in response, the server communicates to the first mobile device a set of tasks to be completed by the first user at specific locations, wherein the set of tasks are those specified by a second user employing a second mobile device, wherein the set of tasks are stored at the server until delivery to the first mobile device.

15. The server of claim 7 wherein the server receives a completion status response from the first mobile device, wherein the completion status response is associated with the task list comprising a plurality of tasks communicated by the server to the first mobile device; and wherein the completion status response for each of the plurality of tasks comprises one of the following status: completed, skipped or deferred.

16. The server of claim 7 wherein the first mobile device is provided a route comprising a plurality of waypoints for navigation, wherein the server receives a notification from the first mobile device whenever the first mobile device determines that it has arrived at one of the plurality of waypoints, wherein, in response to the notification received, the server communicates to the first mobile device a dynamically assembled set of tasks to be completed while at that current waypoint, among the plurality of waypoints.

17. A first mobile device comprising:

an iris scanner;

a processor configured to execute and operate a client software, the client software capable of sending and receiving GPS based location information and retrieving a first task list based on a current location;

the client software configured to send, when prompted, an iris image of a user captured employing the iris scanner and communicating it to a coordinating server, and in response, receiving a second tasks lists for completion by the corresponding user;

the client software configured to automatically retrieve a third task list for the user based on an iris image captured by the iris scanner;

the client software configured to dynamically receive a plurality of item pickup requests from a plurality of businesses, when they are distributed opportunistically to the first mobile device based on a current route being navigated or a current location, wherein the client software updates the status of the individual item pickup requests if it receives a notification of corresponding item pickup; and wherein the client software authenticates the user, if necessary, while the user is conducting item pickup requests, or while the user is conducting the tasks of the first task list, the second task list and the third task list, selectively by means of a password challenge, a PIN code prompt, or a iris image verification using the iris scanner.

18. The first mobile device of claim of 17 wherein the first task list, the second task list and the third task list comprise one or more of the following: monitoring and reporting activities, funds transfer activities, authorized payment activities on behalf of someone else, tasks requiring pickup of items, tasks requiring delivery of items, purchase of items, ride sharing, skills training, delivery of technical help, photo capture, video capture, turning on electronic equipment, turning off electronic equipment, a sales demonstration, security checks and premises cleanup.

19. The first mobile device of claim of 17 further comprising:

the client software identifying and delivering tasks specified by the user for communication to a second user currently using a second mobile device upon determination of the proximity of the second user to a specific destination, or upon receiving notification from the second mobile device indicating arrival at that specific destination; and the client software receiving a completion status response from the second mobile device as and when the second user indicates completion of an associated one of the tasks delivered.

20. The first mobile device of claim of 17 wherein the client software receives and processes a user audio request for tasks associated with a specific first location, and subsequently retrieves and delivers a list of tasks to be conducted by the user, upon determining that the user has succeeded in reaching the specified first location.

21. The first mobile device of claim of 17 wherein the client software of the first mobile device communicates a task list to a second mobile device, and in response, receives from the second mobile device completion status response provided by a second user employing the second mobile device, wherein the completion status response comprises, for each task of the task list, one of the following status: completed, skipped or deferred.

22. The first mobile device of claim of 17 wherein the client software in the first mobile device communicates a destination phone number of a business to a coordination server along with the user's current address or phone number, in response to which it receives from the coordination server a detailed route for traveling from a starting point associated with the user's phone number or address to the destination associated with the business, and receives in addition detailed instructions that is used by the client software in guiding the user to the destination.

23. The first mobile device of claim of 17 wherein client software in the first mobile device conducts a billing transaction for tasks completed.

24. The first mobile device of claim of 17 wherein the client software in the first mobile device communicates a billing request when the user indicates completion of any task.

25. The first mobile device of claim of 17 wherein the first mobile device, upon receiving instructions from the user, forwards a subset of the tasks received to a second user currently employing a second mobile device.

26. The first mobile device of claim of 17 wherein the client software gathers a witness signature attesting to the completion of one or more of the tasks by a user of the first mobile device, wherein the witness signature is provided by a witness.

27. The first mobile device of claim of 17 wherein the client software of the first mobile device provides a map displaying locations where the user successfully completed tasks assigned to the user, along with corresponding task details, and also displays tasks that the user failed to successfully complete, along with their corresponding locations on the map.

* * * * *